United States Patent [19]

Hahn

[11] 4,165,105
[45] Aug. 21, 1979

[54] CABINET TRANSITION SLEEVE

[75] Inventor: Thomas M. Hahn, Louisville, Ky.

[73] Assignee: General Electric Company, Louisville, Ky.

[21] Appl. No.: 864,970

[22] Filed: Dec. 27, 1977

[51] Int. Cl.² ............................................. F16L 35/00
[52] U.S. Cl. .......................................... 285/19; 16/2;
62/DIG. 13; 174/153 G; 285/38; 285/110;
285/158; 285/205; 285/360
[58] Field of Search ...................... 285/19, 20, 38, 158,
285/110, 19 L, 205, 208, 209, 360; 24/73 PF,
221 R; 52/309.2, 787, 718; 248/56, 27; 16/57, 2;
174/65 G, 172 G, 153 G; 277/178, 100;
62/DIG. 13, 217, 333; 220/63 R, 448

[56] References Cited

U.S. PATENT DOCUMENTS

| | | | |
|---|---|---|---|
| 1,218,216 | 3/1917 | Schmid | 16/2 |
| 2,060,942 | 11/1936 | Kline et al. | 220/448 |
| 2,544,394 | 3/1951 | Muffly | 62/267 |
| 2,608,191 | 8/1952 | Schmidt et al. | 62/333 X |
| 2,797,955 | 7/1957 | Wilfert | 174/153 G |
| 2,799,528 | 7/1957 | Wilfert | 174/153 G |
| 3,011,743 | 12/1961 | Heath | 248/27 |
| 3,115,225 | 12/1963 | Fraylick et al. | 52/718 |
| 3,123,389 | 3/1964 | Biesecker | 24/221 R |
| 3,240,502 | 3/1966 | Snyder | 277/100 |
| 3,745,612 | 7/1973 | Seckerson | 24/73 PF |
| 3,918,605 | 11/1975 | Butler | 220/63 R |
| 4,020,644 | 5/1977 | True | 62/DIG. 13 |

FOREIGN PATENT DOCUMENTS

| | | | |
|---|---|---|---|
| 2321154 | 11/1973 | Fed. Rep. of Germany | 248/56 |
| 1538622 | 7/1968 | France | 174/153 G |

*Primary Examiner*—Dave W. Arola
*Attorney, Agent, or Firm*—Frederick P. Weidner; Radford M. Reams

[57] ABSTRACT

A unitary transition sleeve for a double-wall structure such as a refrigerator cabinet used to pass tubing or the like through juxtaposed apertures formed therein. The sleeve includes a tubular body of relatively rigid material having a plurality of radially extending integral flanges formed at each end therof for sealing engagement with each of said walls. The sleeve is adapted to be rotationally secured to one of said walls by means of a plurality of radially exending integral locking tabs projecting from one end thereof. Each of the tabs have a camming face formed thereon to facilitate rotation during assembly. The sleeve includes a plurality of equi-angularly disposed and radially extending detents which positively locate the rotational position of the sleeve in the wall to which it is secured. The annular flanges are flared axially in the direction of the walls to which they engage such that a moisture tight seal is provided about both juxtaposed openings in the walls simultaneously with the mounting of the sleeve. Thumb tabs are also provided to facilitate rotation of the sleeve during the mounting operation. The tubing is sealed to the core of the sleeve by the use of gum or the like.

9 Claims, 6 Drawing Figures

CABINET TRANSITION SLEEVE

CROSS REFERENCE TO RELATED MATTER

This application is related to the commonly-assigned co-pending application Ser. No. 864,979 filed on the same date hereof and of the same inventor.

BACKGROUND OF THE INVENTION

Evaporators for refrigerators, including freezers, comprise a tubular member for the circulation of refrigerant and an extended heat transfer heat exchange surface for providing the desired heat exchange between the refrigerant and the air circulated over the evaporator.

In many modern refrigerators the evaporator is housed in a chamber separate from the refrigerator storage area and the refrigerator compressor is normally disposed at the bottom of the refrigerator underneath the food storage cabinet. Since the condenser is mounted external of the food storage area it is necessary to pass the refrigerant tubing from outside the refrigerator to the inside where the evaporator is housed.

The refrigerant tubing is threaded through juxtaposed openings in the refrigerator inner line and the outer cabinet face. Since the cavity formed by the inner and outer walls contains insulation material it is necessary to isolate the tubing from the insulating material and to prevent moisture from penetrating the insulation. In the past rubber plugs or grommets have been inserted through the openings in the cabinet walls and material such as fiberglass insulation is stuffed circumferentially about the refrigerant tubing. It has been more recently known to use a transition sleeve formed of two parts inserted from both sides of the walls and then fastened in some suitable fashion such as by screwing together. Although this latter mentioned sleeve allowed for better sealing characteristics over the first mentioned method, it still was relatively more expensive to fabricate and required a plurality of assembly steps.

SUMMARY OF THE INVENTION

It is therefore an object of the present invention to provide a transition sleeve of low cost, one piece construction which may be easily assembled to the refrigerator wall structure and provide a moisture resistant seal for the insulation provided between the refrigerator outer case and inner liner. It is a further object to provide a transition sleeve which may be rotationally fixed in the refrigerator cabinet in order to prevent any axial or radial displacement thereof. Still further it is an object of this invention to provide a transition sleeve having annular seals which are operative over a wide range of manufacturing and assembly tolerances. It is an important object to provide a transition sleeve for the refrigerator cabinet structure or the like which provides a seal about juxtaposed openings contained therein simultaneously with the mounting of the sleeve thereto.

In accordance with the illustrated embodiment of the present invention, there is provided a transition sleeve for the refrigerator cabinet comprising a unitary tubular body of relatively rigid material. The body has annular flanges of dissimilar diameters formed integrally therewith to seal juxtaposed apertures of dissimilar diameters formed in the refrigerator walls and provides passage means to permit the refrigerant tubing to be routed from the evaporator through the walls of the refrigerator to the compressor. The end of the sleeve having the smaller diameter flange is inserted through the wall having the largest diameter opening which is greater than the diameter of the flange. The large diameter flange is greater than the diameter of the largest opening in the wall, so that both flanges seal the respective juxtaposed openings upon being mounted thereto. The mounting means includes a plurality of radially extending locking tabs which pass through complementary notches formed diametrically of one of the openings in one of said walls. The tabs have camming faces formed thereon to permit rotational movement within the opening after being inserted therethrough, the camming faces being formed on an obtuse axially extending plane on the forward-side thereof corresponding to the direction of rotation of the sleeve. On a radially extending plane axially offset from the locking tabs there is provided a plurality of equi-angularly radially extending detents which are adapted to engage the aforementioned notches upon rotation of the sleeve. A pair of thumb tabs are provided to assist in the assembly of the sleeve to the cabinet walls. The annular flanges prevent moisture from reaching the insulation material which is introduced in the cavity formed by the two walls, and also prevents the insulation material from escaping outwardly of said cavity.

DESCRIPTION OF THE PREFERRED EMBODIMENT

While the present invention is applicable to any refrigerator including one or more storage compartments and an evaporator for cooling the compartment disposed in an evaporator chamber remote from the compartments, it will be particularly described with reference to a refrigerator such as that described in U.S. Pat. No. 3,320,761, issued to Gelbard and assigned to the same assignee hereof, to which reference is made for detailed description of refrigerator components.

Figure 1:
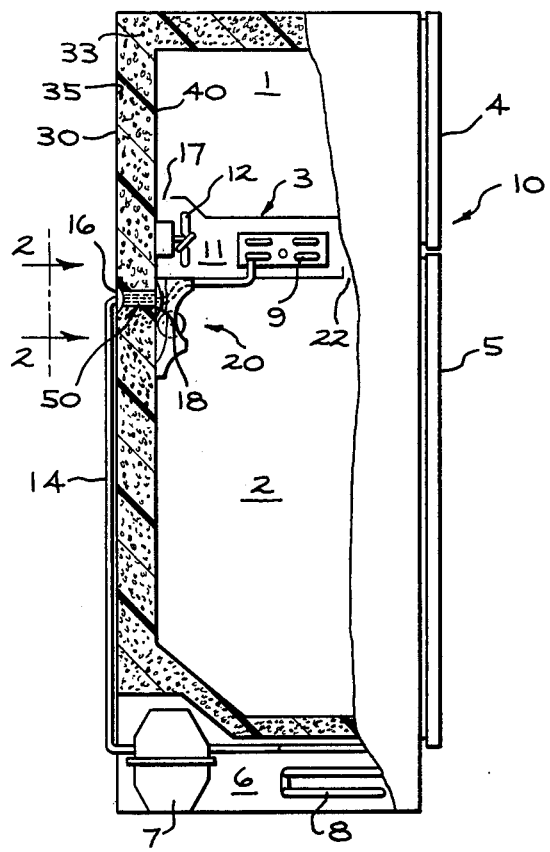
FIG. 1 is a schematic elevational view, partly in section, through a portion of the refrigerator including the present invention.

With reference to FIG. 1, the illustrated refrigerator 10 comprises an upper below-freezing or freezer compartment 1 and a lower above-freezing or fresh food storage compartment 2 separated by an insulated partition, generally indicated by the numeral 3. The access opening to the freezing compartment 1 is closed by means of an insulated door 4 while the access opening to the fresh food compartment 2 is closed by means of a door 5. A machinery compartment 6 in a lower portion of the cabinet contains the refrigerant condensing component of a refrigeration system including a hermetic motor-driven compressor 7 and a condenser 8.

In the illustrated embodiment of the invention, the single evaporator 9 for refrigerating the two comartments 1 and 2 is contained within an evaporator chamber 11 formed within the insulated partition 3. It is to be understood that the compressor 7, the condenser 8, suitable flow restriction means (not shown) and the evaporator 9 are connected in closed series flow relationship to form the usual closed refrigerant circuit.

For the purpose of maintaining the two storage compartments 1 and 2 at their desired operating temperatures, air streams from these two compartments are passed over the evaporator 9 and the refrigerated or cooled air returned to the compartments by means of a single fan generally indicated by the numeral 12. More specifically, the inlet portion of the evaporator chamber 11 is connected by means of a relatively large louvered inlet (not shown) at the forward end of the partition 3 to the freezer compartment 1 and the major portion of the air cooled or refrigerated by the evaporator 9 is returned to the freezer compartment through an air passage shown schematically as 17. The air leaving the passage 17 is often routed to an area housing freezing trays.

Air from the fresh food compartment 2 enters the inlet end of the evaporator chamber 11 through one or more passages or ducts 22 which is relatively smaller than the inlet from the freezer chamber wherein it becomes mixed with the air flowing into the evaporator chamber from the freezer compartment 1 before passing over the evaporator 9. A relatively small portion of the cool refrigerated air flowing from the rear or outlet end of the chamber 11 passes downwardly through an outlet passage (not shown) supplying cooled air to the fresh food compartment.

Mixing means, generally shown by the reference numeral 20, are provided for automatically and continuously mixing the refrigerated air flowing through the outlet with air from the fresh food compartment 2 before it is introduced into the compartment 2. One such device is illustrated and described in detail in the aforementioned U.S. Pat. No. 3,320,761. Preferably, the evaporator is periodically defrosted by use of a radiant heater such as that described in U.S. Pat. No. 3,280,581 issued to Turner and assigned to the assignee hereof. Such a heater (not shown) is positioned to one side of a coil section or when more than one section is employed is positioned between and parallel to the adjacent sections. Due to the open coil structure, heat from a radiant heater so placed will rapidly warm all portions of the evaporator to defrosting temperatures.

A vertically extending tube 14 from condenser 8 rises behind the refrigerator 10 and passes through an aperture 16 in the refrigerator outer wall 30 and then through a juxtaposed aperture 18 formed in the refrigerator inner or liner wall 40 where it is then routed to the evaporator 9. There is illustrated between the aperture 16 and 18 a transition sleeve 50 according to the present invention.

In accordance with the preferred embodiment of this invention, the transition sleeve 50 is adapted to be secured to either the inner or the outer wall of the refrigerator cabinet while simultaneously sealing both of the openings 16 and 18 formed therein. That is, as will be described hereinbelow, one of the openings 16 or 18 is made larger than the other in order to permit the insertion of one end of the sleeve therethrough during the assembly process after the inner liner is already mounted within the outer cabinet case. With the utilization of the sleeve according to the present invention the need for and attendant cost of cutting a passage through the insulation after it has been permitted to rigidify has been eliminated. Further, in addition to the better sealing characteristics of this improved transition sleeve, the method of sealing tube 14 within sleeve 50 is also greatly simplified making the sleeve even more economically attractive.

The transition sleeve 50 includes a tubular body portion 51 which is formed of a relatively rigid material such as thermoplastic, for example. One suitable example of thermoplastic mateial is polypropylene or polyethylene.

Figure 2:
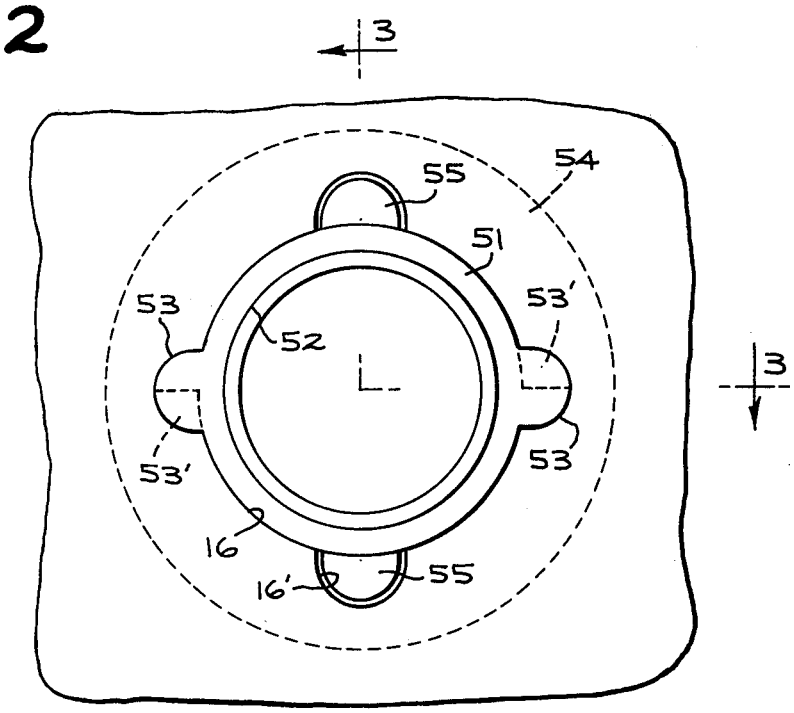
FIG. 2 is a fragmentary enlarged view of a portion of a refrigerator taken generally along lines 2—2 of FIG. 1, but with the refrigerant tubing removed.
Figure 3:
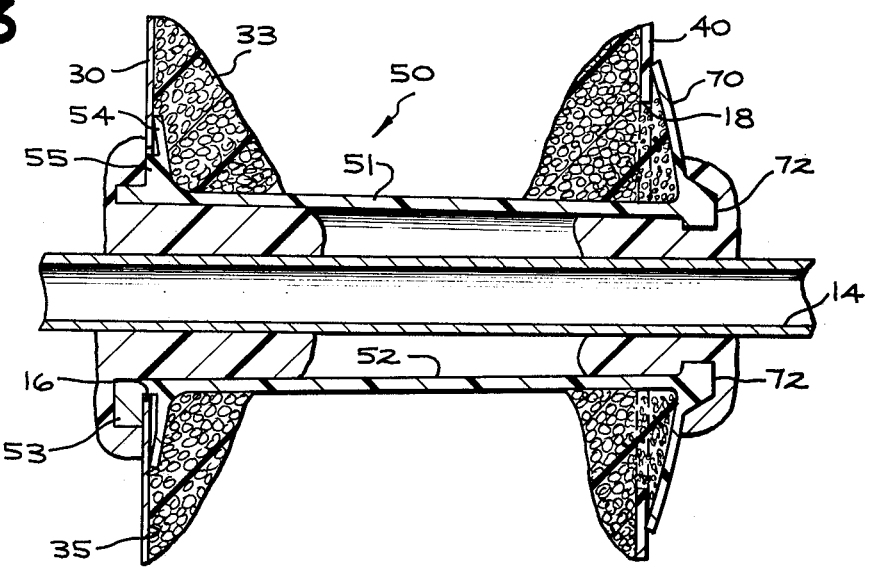
FIG. 3 is a fragmentary sectional view of the refrigerator cabinet and transition sleeve of this invention taken along lines 3—3 of FIG. 2, illustrating the insulation and refrigerant tubing in place.
Figure 5:
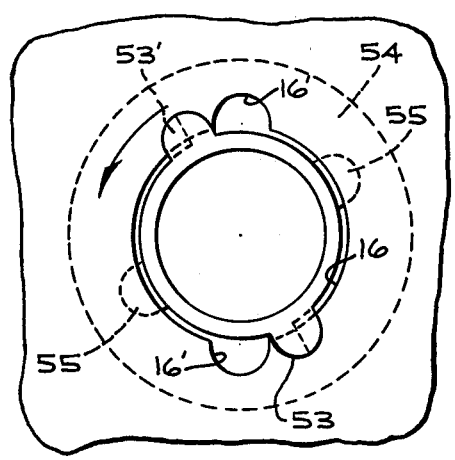
FIG. 5 is a fragmentary enlarged view of one end of the transition sleeve being assembled to one of the refrigerator walls.
Figure 6:
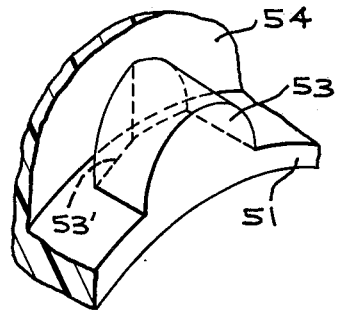
FIG. 6 is a partial perspective view, partly in section, of a portion of the transition sleeve of the present invention.

Referring to FIG. 3, the transition sleeve 50 is shown in more detail. The sleeve comprises a longitudinal body portion 51 having a hollow core 52 through which the tubing 14 is routed. Formed integrally with the body 51 at one end thereof are a plurality of radially extending locking tabs 53 which project circumferentially of the body portion 51. As shown in FIG. 2 there are two tabs 53 disposed 180° one from the other, however, it will be appreciated by those skilled in the art that more tabs could be used without departing from the scope and intent of this invention. Also, as was mentioned above, the tabs 53 could be formed at either or both ends of sleeve 51 and have the same effectiveness. Each of the locking tabs 53 have a camming surface 53', these camming surfaces or faces being formed on an obtuse axially extending plane on the rotationally forward-side thereof as is best seen in FIG. 6. That is, when sleeve 51 is inserted or telescoped through the opening or aperture 16 in the refrigerator outer wall 30 by passing through diametrically disposed complementary notches 16' formed therein, the camming surfaces 53' facilitate rotation within the opening when moved in a direction of the arrow shown in FIG. 5. Although a generally semi-circular arcuate projection 53 is shown, other shapes and sizes may also be used, providing the notches 16' are cut to conform to whatever geometrical shape is selected.

In close proximity to tabs 53 and spaced axially inwardly thereof there extends the first annular flange or seal member 54 projecting radially from body 51. Flange 54 is flared axially-outwardly so as to circumferentially envelope tabs 53. In the unmounted state the radial outer extremity of flange 54 extends axially beyond at least a portion of tabs 53. Thus, when sleeve 50 is mounted to the wall 30 as shown in FIG. 3, flange 54 is caused to be compressed or flexed against wall 30 causing a tight sealing engagement therewith perimetrically of the opening 16 formed therein.

On a radially extending plane disposed axially between said tabs 53 and said flange 54 there are a plurality of radially extending projections or detents 55 extending circumferentially from said body member 51. The stop tabs or detents 55 have the same general configuration of the locking tabs 53 and are adapted to snap into the notches 16' as shown in FIG. 3 when the sleeve 51 is rotated in the direction of the arrow shown in FIG. 5. The "snapping" force is provided by the flexed flange 54. In the preferred embodiment the detents 55 are disposed at right angles to the locking tabs 53 in alternating relationship therewith. That is, the stop tabs 55 and locking tabs 53 are equi-angularly spaced circumferentially of the body member 51. One skilled in the art will appreciate that the stop tabs or detents 55 and locking tabs 53 need not be spaced equi-angularly, and indeed, the number of stop tabs required need not equal the number of locking tabs in order to perform their function of preventing sleeve 51 from displacement and also to prohibit further rotational movement of the sleeve 51 in the aperture or opening 16. However, a symmetrical relationship between stop tabs 55 and locking tabs 53 provide a generally uniform and consistent assembly force.

Figure 4:
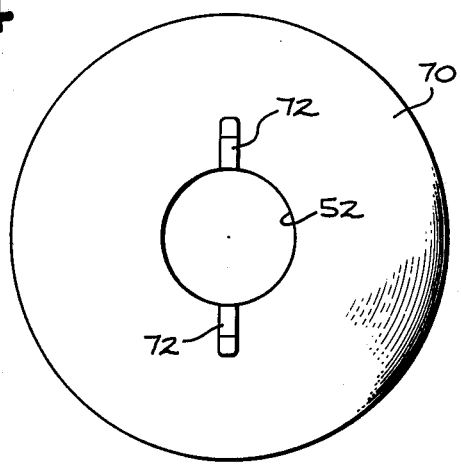
FIG. 4 is a full view in elevation of one end of the transition sleeve according to the present invention in the unassembled state.

At the opposite end of the body member 51 as can be better seen in FIGS. 3 and 4 there is a second annular flange 70 formed integrally with the body 51 and extending radially therefrom. Flange 70 is flared axially-inwardly of the body 51 in the same direction as flange 54. Flange 70 has a plurality of mounting or thumb tabs 72 formed integrally thereon and extending generally axially thereof.

As was mentioned above, flange 54 in its unflexed state has an outer diameter less than the opening 18 formed in wall 40 but larger than the diameter of the opening 16 in wall 30, whereas flange 70 has an outer diameter larger than the diameter of the opening 18 formed in wall 40. The respective diameters of flanges 54 and 70 are selected to compensate for the manufacturing and assembly tolerances of the openings which they are to seal, that is, apertures 16 and 18 respectively. The assembler inserts the body 51 through the opening 18 and then telescopes locking tabs 53 through the notches 16' in wall 30, thereby compressing flanges 54 and 70 against walls 30 and 40 respectively. When the sleeve 51 is rotated by exerting the appropriate pressure to the thumb tabs 72 annular flanges 54 and 70 remain compressed or flexed against the walls 30 and 40 thereby sealing the openings 16 and 18 respectively.

When insulating foam 33 is introduced in the cavity 35 formed by the outer and inner walls 30 and 40 respectively, the pressure released in the foaming process further reacts against the convex radially extending portion of annular flange 54 thereby enhancing its sealing force and preventing insulation from escaping through opening 16. Simultaneously therewith, a portion of the foam escapes through the opening 18 in wall 40 but is trapped within the concave portion of flange 70 through the seal caused by the outer extremity of flange 70 with the outer portion of wall 40.

When the foaming process is completed and the evaporator is installed, the refrigerant tubing 14 is routed through the hollow portion 52 of the sleeve 51 and a gum or glue-like material 60 is placed circumferentially of the tubing 14 to prevent leakage of cool air from inside the food storage area 2. It will be appreciated that other structure or materials could also be used to block the air movement about the tubing 14 within the inner core 52 such as metal or rubber grommets.

In addition to providing a moisture tight seal with the insulation 30 it will also be appreciated that the sleeve according to this invention is of simple one piece construction and lends itself to an efficient effective and economic assembly process.

For purposes of exemplification, the particular embodiment of the invention has been shown and described according to the best present understanding thereof. However it will be apparent that changes and modifications in the arrangement and construction of the parts thereof may be resorted to without departing from the spirit and scope of the invention. For example, the locking tabs 53 and detents 55 could have been formed at the opposite end of the sleeve 51 from that described above, or the relative size of openings 16 and 18 could be reversed and the sleeve 51 could be inserted through wall 30 and mounted such that the flange 70 is located externally of the refrigerator cabinet outer wall 30.

What is claimed is:

1. A transition sleeve for use in a refrigerator cabinet or the like having insulation contained in a cavity formed by first and second walls of said cabinet, the walls having first and second juxtaposed openings formed therein of dissimilar diameters through which tubing or the like may pass, said sleeve comprising:

a unitary tubular body of a relatively rigid material;
mounting means formed at one end of said body for securing the body to one of said openings in one of said walls, said mounting means including a plurality of locking tabs adapted to telescope through said opening for rotation thereabout;
one end of said body including a first annular flange having a diameter less than said first opening but greater than said second opening and adapted to circumferentially seal said second opening on the cavity-side thereof;
a second annular flange at the other end of said body having a diameter greater than said first opening and adapted to circumferentially seal said first opening on the non-cavity-side thereof when said body is secured to the walls by said mounting means, said second annular flange having a plurality of mounting tabs formed integrally therewith and projecting generally axially thereof to provide gripping means for rotational movement of the tubular body.

2. The sleeve according to claim 1 wherein said locking tabs comprise projections extending radially from said tubular body circumferentially thereof.

3. The sleeve of claim 3 wherein said locking tabs are spaced laterally of one of said annular flanges and each of said tabs has a laterally extending camming face to facilitate perimetrical rotation about the opening to which it is mounted.

4. The sleeve of claim 3 wherein said locking tabs are formed at the end of said body which includes said first annular flange.

5. The sleeve of claim 4 wherein the second opening in one of said walls has a plurality of complementary notches formed diametrically thereof to receive said locking tabs.

6. The sleeve of claim 5 wherein the end of said body having said first annular flange includes also a plurality of detents extending radially from said body and being angularly spaced to conform to the angular spacing of said locking tabs, said detents located axially between said tabs and said first annular flange whereby said detents engage said notches to prohibit rotational movement after the locking tabs are telescoped through said notches and rotated within said opening thereby drawing said first and second annular flanges into sealing engagement circumferentially of said second and first openings respectively.

7. The sleeve of claim 1 wherein said first and second annular flanges are flared axially in the same direction toward said walls.

8. The sleeve of claim 1 wherein said first annular flange is adapted to be flexed axially outwardly toward one of said walls when insulation material is introduced in said cavity.

9. The sleeve of claim 8 wherein said first flange is secured to said first wall of said cabinet and the second flange is mounted to said second wall of said cabinet.

* * * * *

UNITED STATES PATENT AND TRADEMARK OFFICE
CERTIFICATE OF CORRECTION

PATENT NO. : 4,165,105
DATED : August 21, 1979
INVENTOR(S) : Hahn

It is certified that error appears in the above-identified patent and that said Letters Patent are hereby corrected as shown below:

Column 6, Line 35, Claim 3, delete the number "3" and insert the number "2"

*Signed and Sealed this*

*Thirteenth* Day of *November 1979*

[SEAL]

*Attest:*

RUTH C. MASON
*Attesting Officer*

LUTRELLE F. PARKER
*Acting Commissioner of Patents and Trademarks*